US008826283B2

(12) United States Patent
Chen et al.

(10) Patent No.: US 8,826,283 B2
(45) Date of Patent: Sep. 2, 2014

(54) LOW OVERHEAD FAULT TOLERANCE THROUGH HYBRID CHECKPOINTING AND REPLAY

(71) Applicant: VMware, Inc., Palo Alto, CA (US)

(72) Inventors: Peter M. Chen, Ann Arbor, MI (US); Daniel J. Scales, Mountain View, CA (US); Min Xu, Palo Alto, CA (US); Matthew D. Ginzton, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/926,777

(22) Filed: Jun. 25, 2013

(65) Prior Publication Data
US 2013/0290781 A1    Oct. 31, 2013

Related U.S. Application Data

(63) Continuation of application No. 12/259,762, filed on Oct. 28, 2008, now Pat. No. 8,499,297.

(51) Int. Cl.
*G06F 11/14*    (2006.01)
*G06F 11/20*    (2006.01)
*G06F 17/30*    (2006.01)

(52) U.S. Cl.
CPC ............ *G06F 11/14* (2013.01); *G06F 11/1484* (2013.01); *G06F 11/1471* (2013.01); *G06F 11/1438* (2013.01); *G06F 11/2023* (2013.01); *G06F 17/30233* (2013.01)
USPC .......................................................... 718/100

(58) Field of Classification Search
CPC ...................................................... G06F 11/14
See application file for complete search history.

(56) References Cited

U.S. PATENT DOCUMENTS

| 5,488,716 | A  | * | 1/1996 | Schneider et al. | 714/10 |
|---|---|---|---|---|---|
| 6,421,739 | B1 | * | 7/2002 | Holiday | 719/330 |
| 6,772,410 | B1 | * | 8/2004 | Komatsu et al. | 717/124 |
| 6,795,966 | B1 | * | 9/2004 | Lim et al. | 718/1 |
| 7,093,086 | B1 | * | 8/2006 | van Rietschote | 711/161 |
| 7,370,164 | B1 | * | 5/2008 | Nagarkar et al. | 711/162 |
| 7,519,858 | B2 | * | 4/2009 | Korlepara | 714/15 |
| 7,627,727 | B1 |   | 12/2009 | Kekre et al. | |
| 7,774,391 | B1 | * | 8/2010 | Le et al. | 707/822 |
| 7,971,015 | B2 | * | 6/2011 | Waldspurger et al. | 711/162 |
| 8,032,351 | B2 | * | 10/2011 | Stringham | 703/21 |
| 8,037,032 | B2 | * | 10/2011 | Pershin et al. | 707/681 |
| 8,347,140 | B1 | * | 1/2013 | Backensto et al. | 714/15 |

(Continued)

OTHER PUBLICATIONS

Samuel T. King, George W. Dunlap and Peter M. Chen, "Debugging operating systems with time-traveling virtual machines." Proceedings of the 2005 Annual USENIX Technical Conference, Apr. 2005.

(Continued)

*Primary Examiner* — Eric Coleman

(57) ABSTRACT

A virtualized computer system provides fault tolerant operation of a primary virtual machine. In one embodiment, this system includes a backup computer system that stores a snapshot of the primary virtual machine and a log file containing non-deterministic events occurring in the instruction stream of the primary virtual machine. The primary virtual machine periodically updates the snapshot and the log file. Upon a failure of the primary virtual machine, the backup computer can instantiate a failover backup virtual machine by consuming the stored snapshot and log file.

14 Claims, 6 Drawing Sheets

(56) References Cited

U.S. PATENT DOCUMENTS

| | | | |
|---|---|---|---|
| 8,364,639 B1 * | 1/2013 | Koryakina et al. | 707/639 |
| 8,495,316 B2 * | 7/2013 | Nagarkar et al. | 711/162 |
| 2003/0233491 A1 * | 12/2003 | Bracha et al. | 709/331 |
| 2006/0085792 A1 | 4/2006 | Traut | |
| 2006/0184937 A1 | 8/2006 | Abels et al. | |
| 2007/0033356 A1 * | 2/2007 | Erlikhman | 711/162 |
| 2007/0094659 A1 | 4/2007 | Singh et al. | |
| 2007/0244938 A1 | 10/2007 | Michael et al. | |
| 2007/0271428 A1 | 11/2007 | Atluri | |
| 2008/0133208 A1 | 6/2008 | Stringham | |
| 2008/0244535 A1 | 10/2008 | Nelson et al. | |
| 2009/0070761 A1 | 3/2009 | Zhao | |
| 2009/0216816 A1 | 8/2009 | Basler et al. | |
| 2009/0222496 A1 | 9/2009 | Liu et al. | |
| 2009/0300080 A1 | 12/2009 | Stringham | |
| 2010/0049930 A1 | 2/2010 | Pershin et al. | |
| 2010/0107158 A1 | 4/2010 | Chen et al. | |

OTHER PUBLICATIONS

Thomas C. Bressoud and Fred B. Schneider, "Hypervisor Based Fault Tolerance." ACM Transactions on Computer Systems, vol. 14, No. 1, Feb. 1996, pp. 80-107.

* cited by examiner

LOW OVERHEAD FAULT TOLERANCE THROUGH HYBRID CHECKPOINTING AND REPLAY

CROSS REFERENCE TO RELATED APPLICATIONS

This application is a continuation of the U.S. patent application Ser. No. 12/259,762 filed on Oct. 28, 2008, now issued as U.S. Pat. No. 8,499,297 on Jul. 30, 2013, entitled "Low Overhead Fault Tolerance through Hybrid Checkpointing and Replay."

BACKGROUND OF THE INVENTION

A fundamental tradeoff in providing computer system fault tolerance is low fault-free execution overhead versus short fault-recovery latency. Current techniques for creating fault tolerant computer systems strike balances between consuming significant computing resources to provide faster recovery times and tolerating longer recovery times to conserve such resources. For example, while multiple instances of the same system may be run in parallel to provide robust fault tolerance, such redundancy increases the cost of failure-free operation, in terms of hardware, processing overhead, memory bandwidth, power consumption and other computing resources. More passive checkpointing and replication techniques, such as starting up backup instances of the system only upon a failure of the primary instance, achieve lower total computing and/or hardware overhead but require longer recovery times and/or provide incomplete recovery which is visible to software in the system. Furthermore, in any of the foregoing techniques, implementation of fault tolerance for a particular system requires costly and complex modifications to the hardware, operating system and/or applications to coordinate multiple instances of the system.

A virtual machine platform such as VMware Workstation 6 can provide fault tolerance without modifying the hardware, operating system and/or applications of a particular system running within a virtual machine. Assuming that the initial system state of a primary and backup virtual machine are identical, the virtual machine monitor layer of the primary virtual machine can capture the virtual machine's instruction stream in real-time and transmit such instructions to the backup virtual machine to "replay" the primary virtual machine's execution in a synchronized fashion. If the primary virtual machine fails, the backup virtual machine can take over. However, while fault tolerance implemented by creating multiple simultaneously running virtual machines provides a capability of coordinating the instances at a virtualization software layer without needing to modify the hardware, operating system or applications, failure-free operation still remains expensive since the primary virtual machine and the backup virtual machine are both simultaneously executing all instructions thereby consuming computing resources which cannot be otherwise utilized.

SUMMARY OF THE INVENTION

In one or more embodiments of the invention, a hybrid checkpoint and replay approach is utilized to reduce the overhead needed to support fault tolerance in virtual machine platforms. In this hybrid approach, the primary virtual machine's instruction stream is not replayed on a backup virtual machine until there is a failure of the primary virtual machine. Delaying the replay of a primary virtual machine's instruction stream on a backup virtual machine until the failure of the primary virtual machine eliminates redundant simultaneous execution of a primary and backup virtual machine to support fault tolerance.

To reduce the need to replay a long sequence of instructions to recover the primary virtual machine's most recent state, the primary virtual machine takes periodic incremental "checkpoints" of its state and sends these checkpoints to the backup virtual machine system. These checkpoints are incremental in that they include state changes since the last checkpoint such that a backup virtual machine restores the state of the latest checkpoint and then replays the primary virtual machine's instruction stream from the latest checkpoint.

A method according to an embodiment of the invention provides fault-tolerance protection for a primary virtual machine using a snapshot image of the primary virtual machine that represents a state of the primary virtual machine at a time $t_0$. The method comprises tracking virtual machine instructions executed by the primary virtual machine since time $t_0$, tracking a set of changes made to the state of the primary virtual machine since time $t_0$, and merging the set of changes into the snapshot image, thereby creating a new snapshot image for a backup virtual machine. In some embodiments, the merging step occurs upon receiving the set of changes, while in other embodiments, the merging step occurs upon a failure of the primary virtual machine. Other embodiments further provide additional steps of storing in a log file information relating to the tracked virtual machine instructions executed by the primary virtual machine, and discarding from the log file any information relating to virtual machine instructions executed by the primary virtual machine since time $t_0$.

DETAILED DESCRIPTION

A. Current Virtualization Platform Architecture

Figure 1A:
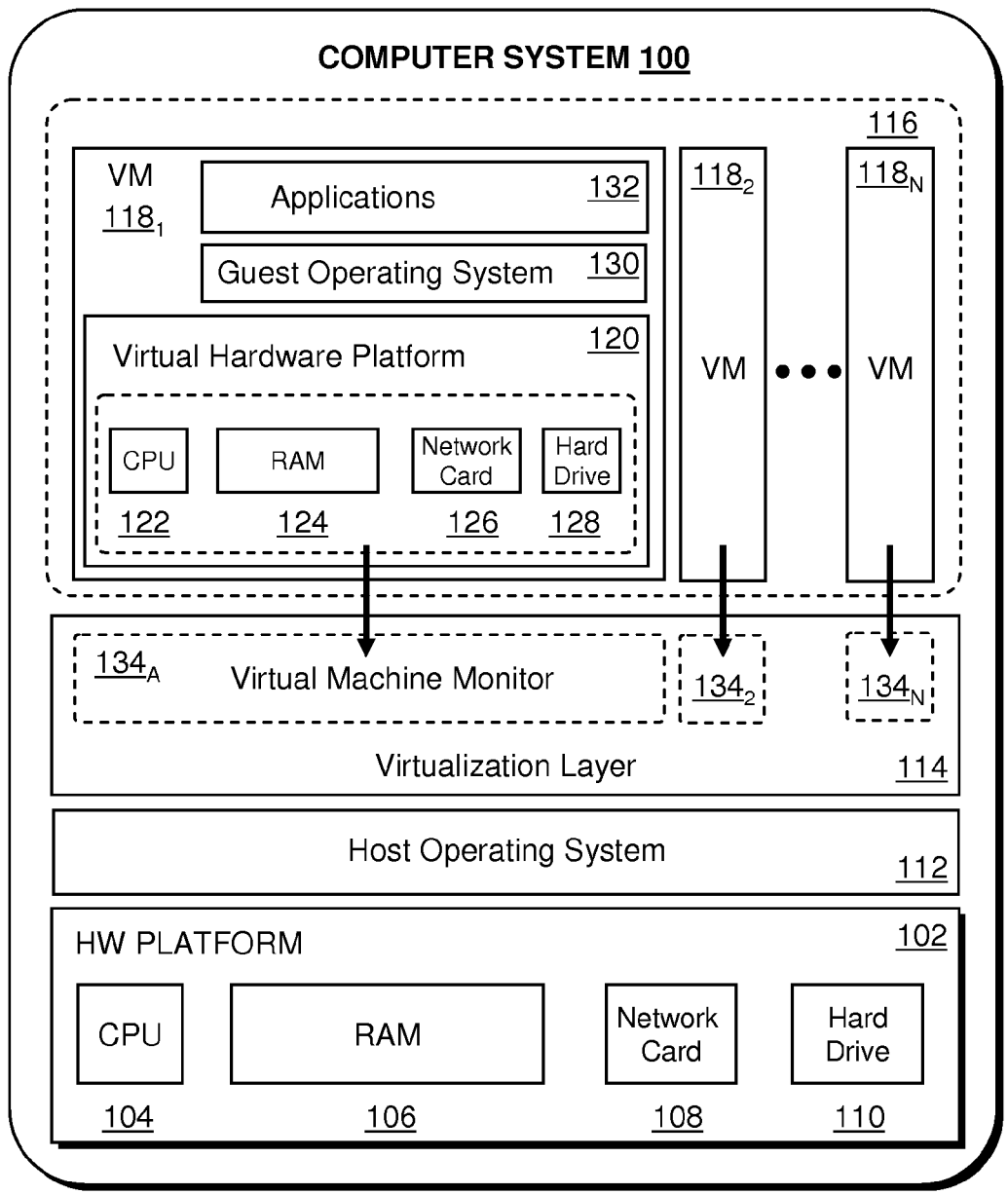
FIGS. 1A and 1B depict functional block diagrams of computer systems implementing virtualized computer platforms.
Figure 1B:
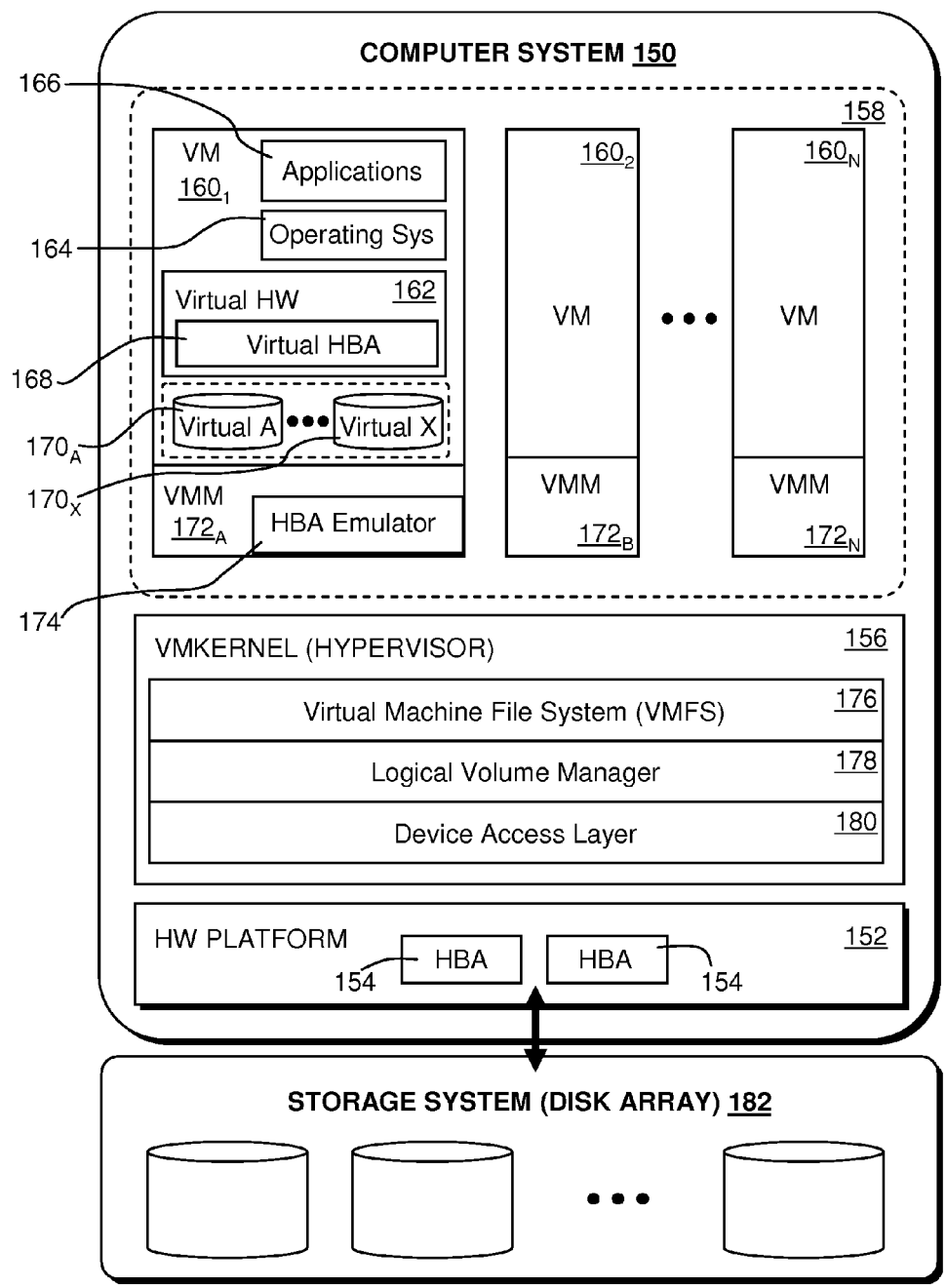

FIGS. 1A and 1B depict functional block diagrams of virtualized computer systems in which one or more embodiments of the invention may be practiced. A computer system 100 may be constructed on a typical desktop or laptop hardware platform 102 such as an x86 architecture platform. Such a hardware platform may include a CPU 104, RAM 106, network card 108, hard drive 110 and other I/O devices such as mouse and keyboard (not shown). A host operating system 112 such as Microsoft Windows, Linux or NetWare runs on top of hardware platform 102. A virtualization software layer 114 is installed on top of host operating system 112 and provides a virtual machine execution space 116 within which multiple virtual machines (VMs) $118_1$-$118_N$ may be concurrently instantiated and executed. In particular, virtualization layer 114 maps the physical resources of hardware platform 102 (e.g., CPU 104, RAM 106, network card 108, hard drive 110, mouse, keyboard, etc.) to "virtual" resources of each virtual machine $118_1$-$118_N$ such that each virtual machine $118_1$-$118_N$ has its own virtual hardware platform 120 with its own emulated CPU 122, RAM 124, network card 126, hard drive 128 and other emulated I/O devices. For example, virtual hardware platform 120 may function as an equivalent of a standard x86 hardware architecture such that any x86 supported operating systems such as Microsoft Windows, Linux, Solaris x86, NetWare, FreeBSD, etc. may be installed as the guest operating system 130 in order to execute applications 132 for an instantiated virtual machine such as $118_1$. As part of the virtualization layer 114, virtual machine monitors (VMM) $134_A$-$134_N$ implement the virtual system support needed to coordinate operation between the host operating system 112 and their corresponding virtual machines $118_1$-$118_N$. An example of software implementing a virtualization layer 114 for a desktop or laptop hardware platform 102 is VMware Workstation™ 6, which is available from VMware Inc. of Palo Alto, Calif.

A computer system 150 is an alternative system in which one or more embodiments of the invention may be practiced. Computer system 150 may be constructed on a conventional server-class, hardware platform 152 including host bus adapters (HBA) 154 in addition to conventional platform processor, memory, and other standard peripheral components (not separately shown). Hardware platform 152 may be coupled to an enterprise-class storage system 182. Examples of storage systems 182 may be a network attached storage (NAS) device, storage area network (SAN) arrays, or any other similar disk arrays known to those with ordinary skill in the art. Those with ordinary skill in the art will also recognize that enterprise-level implementations of the foregoing may have multiple computer systems similar to computer system 150 that may be connected through various different known topologies and technologies (e.g., switches, etc.) to multiple storage systems 182. A virtualization software layer (also sometimes referred to as a hypervisor) such as, for example, VMware's VMkernel™ 156 in its server-grade VMware ESX® product, is installed on top of hardware platform 152 and supports virtual machine execution space 158 within which multiple VMs $160_1$-$160_N$ may be concurrently instantiated and executed. Each such virtual machine $160_1$-$160_N$ implements a virtual hardware (HW) platform 162 that supports the installation of a guest operating system 164 which is capable of executing applications 166. Similar to guest operating system 130, examples of guest operating system 164 may be Microsoft Windows, Linux, Solaris x86, NetWare, FreeBSD or any other operating system known to those with ordinary skill in the art that targets the virtualized platform. In each instance, guest operating system 164 includes a native file system layer (not shown), for example, either an NTFS or an ext3 type file system layer. These file system layers interface with virtual hardware platform 162 to access, from the perspective of guest operating system 164, a data storage HBA, which in reality, is a virtual HBA 168 implemented by virtual hardware platform 162 that provides the appearance of disk storage support (i.e., virtual disks $170_A$-$170_X$) to enable execution of guest operating system 164 transparent to the virtualization of the system hardware.

Although, from the perspective of guest operating systems 164, file system calls to initiate file system-related data transfer and control operations appear to be routed to virtual disks $170_A$-$170_X$, in reality, such calls are processed and passed through virtual HBA 168 to adjunct virtualization software layers (for example, VMM layers $172_A$-$172_N$) that implement the virtual system support needed to coordinate operation with VMkernel 156. In particular, host bus emulator 174 functionally enables the guest operating system file system calls to be correctly handled by VMkernel 156 which passes such operations through to true HBAs 154 that connect to storage system 182. For example, VMkernel 156 receives file system calls from VMM layers $172_A$-$172_N$, and converts them into file system operations that are understood by a virtual machine file system (VMFS) 176 which in general, manages creation, use, and deletion of files stored on storage system 182. VMFS 176, in turn, converts the file system operations to volume block operations, and provides the volume block operations to a logical volume manager (LVM) 178, which supports volume oriented virtualization and management of the disk volumes in storage system 182. LVM 178 converts the volume block operations into raw disk operations for transmission to a device access layer 180. Device access layer 180, including device drivers (not shown), applies command queuing and scheduling policies to the raw disk operations and sends them to HBAs 154 for delivery to storage system 182.

B. Fault-Tolerance with Simultaneously Running Primary and Backup VMs

Figure 2:
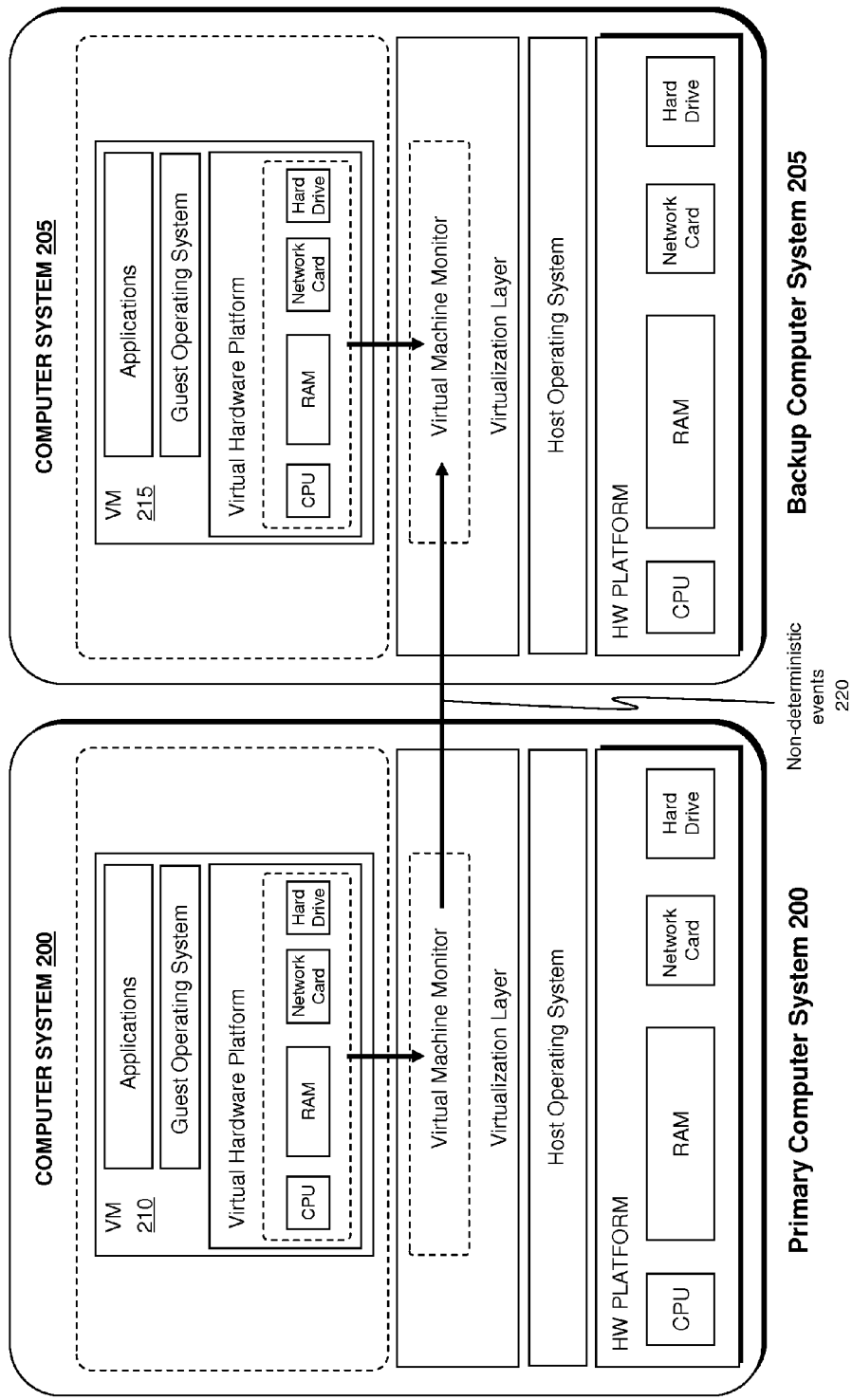
FIG. 2 depicts communication between a primary and backup virtual machine in an implementation of a fault-tolerant architecture.

FIG. 2 depicts an implementation of a fault-tolerant architecture using virtualized computing systems similar to those of FIGS. 1A and 1B. In the embodiment of FIG. 2, a primary VM 210 running on a computer system 200 is supported by a failover backup VM 215 running on a computer system 205. Upon a failure of primary VM 210, failover backup VM 215 can take over without discernable loss of time. In the embodiment of FIG. 2, each of the primary and backup VMs runs on its own hardware computer system (i.e., 200 and 205) in order to provide protections against hardware failure. Those with ordinary skill in the art will recognize that other variations of fault-tolerant virtual machine platform architectures may be utilized without departing from the spirit of the invention. For example, an alternative embodiment may have both primary VM system 200 and backup VM system 205 utilizing a common storage system or disk array rather than individual hard drives. Similarly, the primary VM and backup VM may be run on the same hardware computer system in an alternative embodiment (which may not provide as strong guarantees in the event of hardware failure).

As shown in FIG. 2, information relating to non-deterministic events 220 occurring in the virtual machine instruction stream of primary VM 210 are captured by its VMM and transmitted to the VMM of backup VM 215 for execution at the same point (and with the same data) within the virtual machine instruction stream of backup VM 215. Examples of such non-deterministic events include reads from external devices (e.g., network, keyboard or timer, etc.) and virtual machine interrupts (e.g., indication after a data read instruction that DMA transfer from disk has been completed and is ready to be read, etc.). For example, in one embodiment, the timing (e.g., placement within the virtual machine instruction stream) and data values (e.g., network data, key selection, time, etc.) corresponding to reads from such external devices are transmitted from primary VM 210 to backup VM 215. Similarly, the timing (e.g., placement within the instruction stream) of a virtual machine interrupt indicating that DMA transfer from disk has been completed is transmitted to backup VM 215 (the data value of the DMA transfer itself may not necessarily be transmitted in such an embodiment because the disk itself is emulated in backup VM 215 and therefore could deterministically retrieve the correct data). In such an embodiment, so long as backup VM 215 executes its instructions at a pace that is at least one non-deterministic event behind the primary VM's execution stream (i.e., backup VM 215 knows when to insert the next non-deterministic event occurring at primary VM 210 into its own instruction stream), backup VM 215 can continue execution of its own instruction stream sequence without fear of executing instructions that were not executed by primary VM 210.

C. Deterministic VM Record and Subsequent Replay

One or more embodiments of the invention leverage the capability of certain virtual machine platforms to record and subsequently replay the execution behavior of virtual machines at a later point in time, in contrast to running a primary and backup virtual machines in parallel as described Section B. An example of a virtual machine with record and replay features in which embodiments of the invention can be implemented is VMware Workstation 6, which is available from VMware Inc. of Palo Alto, Calif. In one embodiment, to support replay at a later point in time, a VM records information corresponding to the non-deterministic events that occur within its instruction stream. Such non-deterministic events include reads from external devices, such as the network, keyboard or timer, and asynchronous events such as interrupts.

Figure 3:
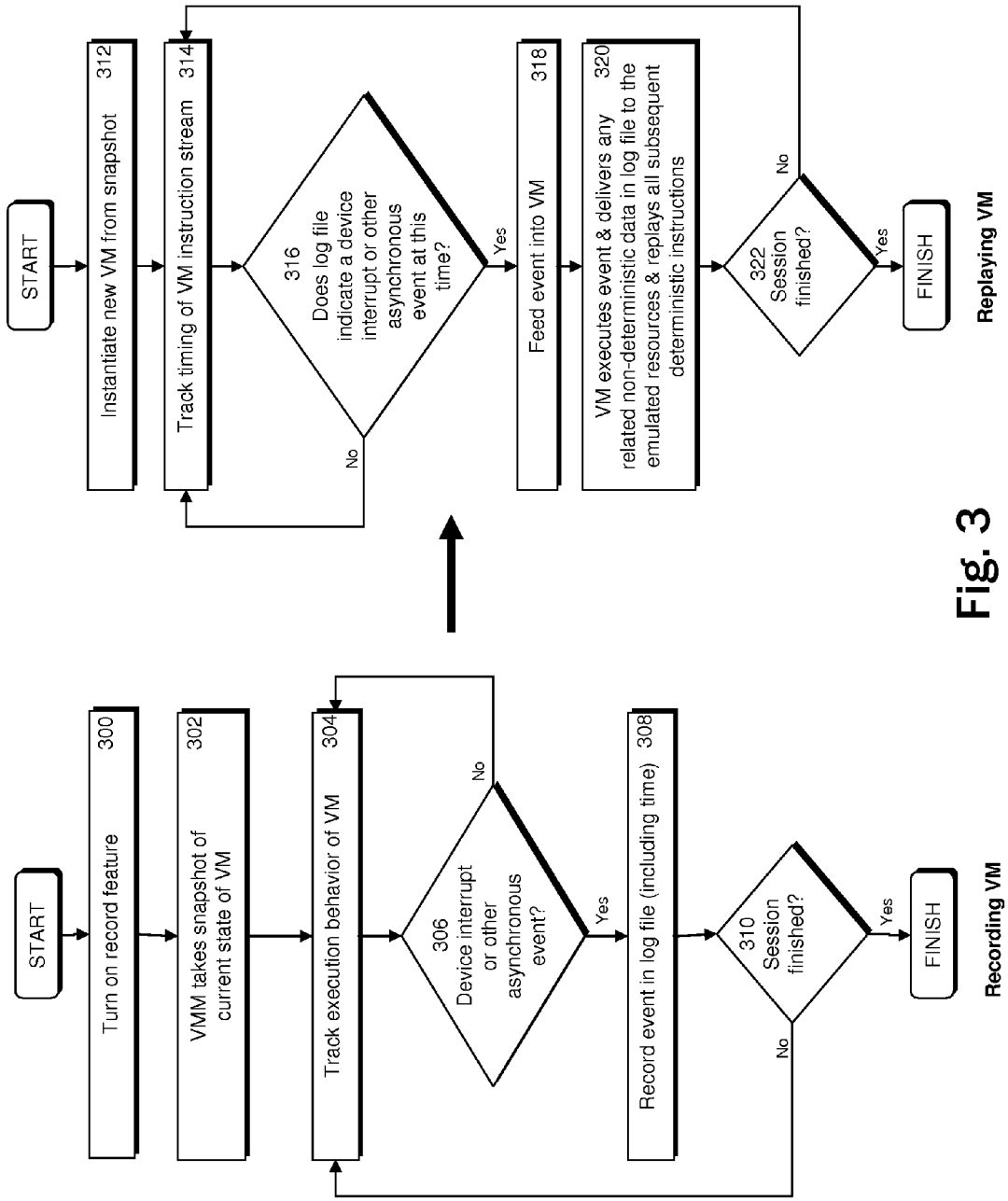
FIG. 3 depicts a flow diagram of record and replay functionality on a virtual machine platform in accordance with one or more embodiments of the present invention.

A record and replay functionality as implemented in one or more embodiments of the invention is depicted in FIG. 3. First, the VMM of a VM enables the recording feature (step 300), takes a snapshot of the VM state (e.g., guest memory, registers, disks, etc.) (step 302), and begins tracking system behavior (including CPU and device activity) as the VM executes (step 304). When non-deterministic events such as device interrupts or other asynchronous events occur (step 306), information relating to such events are recorded in a log file (step 308). Such information includes the timing (e.g., placement within the instruction stream, such as the $n^{th}$ instruction in the stream) of the occurrence so that a replaying VM can execute the event at the same time within its own instruction stream. Those with ordinary skill in the art will recognize that other information may also need to be logged including, for example, contents of incoming networking packets or outputs from other external devices such as keyboards or timers (e.g., data that cannot be deterministically obtained from emulated devices).

To replay the recording, a new VM is instantiated from the snapshot taken in step 302 (step 312) and tracks the timing of the execution of its instruction stream in step 314. If the log file recorded by the recording VM indicates the occurrence of a non-deterministic event (step 316), the VMM of such a "replay" VM feeds the non-deterministic event into the instruction stream of the replay VM at the same point in time that it occurred during the original execution (step 318). The replay VM executes the event, for example, by delivering any related non-deterministic data recorded in the log file to the appropriate emulated resources (e.g., CPU, RAM, network card, hard drive, etc.) such that all subsequent deterministic instructions may be replayed (step 320) until the session ends or the next non-deterministic event in the log file (step 322).

Those with ordinary skill in the art will recognize that other methods of VM record may be implemented in an embodiment. For example, instead of recording the non-deterministic external inputs to emulated devices (e.g., data from the network into the emulated network card, key values inputted into the emulated keyboard, etc.) as in the foregoing embodiment, an alternative embodiment may instead record all outputs from an emulated device to the CPU. During replay, the recorded values themselves would be resupplied to the VM obviating the need for device emulation (i.e., the device's outputs are supplied instead by the log itself).

D. Fault Tolerance Using Checkpointing and Record/Replay

As detailed in Section B, current methods of fault tolerance on virtualized platforms require a significant amount of redundant computing resources during failure-free operation, namely, the requirement of keeping failover backup virtual machines running in synchronized fashion with the primary virtual machine. Redundant execution by the backup virtual machines increases the total power consumed by the fault-tolerant system and increases the number of computer systems needed to support a given workload. A combination of checkpointing and record and subsequent replay can be used to reduce the overall load of a fault tolerant virtualized system.

Figure 4:
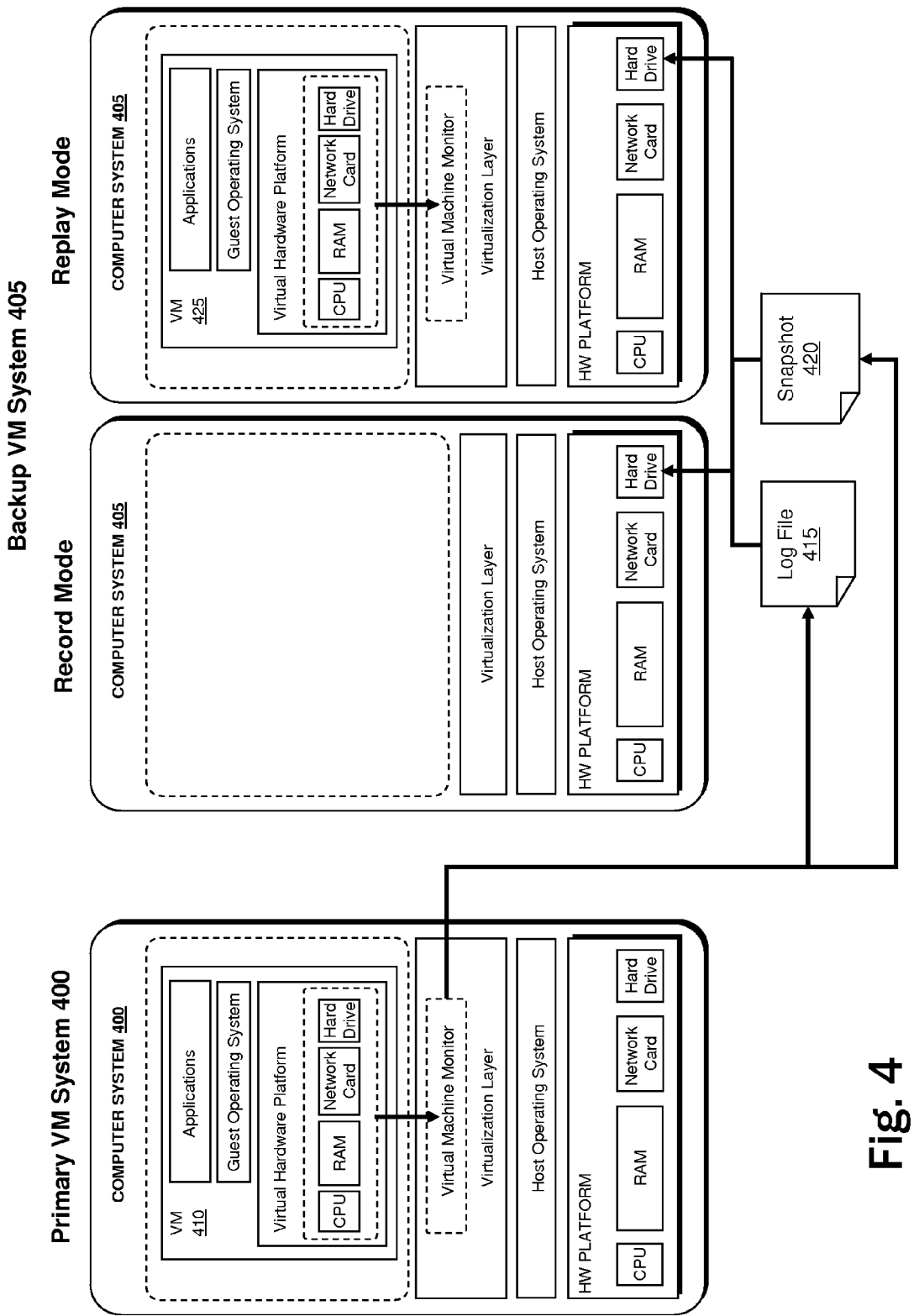
FIG. 4 depicts a block diagram for a virtual machine platform using a record and replay technique to achieve fault tolerance in accordance with one or more embodiments of the present invention.

FIG. 4 depicts a block diagram for a virtual machine platform using a record and replay technique to achieve fault tolerance according to an embodiment of the invention. During failure-free operation, a backup VM system 405 receives and stores a record log 415 of the execution of a primary VM 410 running on a primary VM system 400 and a snapshot 420 of the state of primary VM 410. When primary VM 410 fails, backup VM system 405 uses snapshot 420 and record log 415 to re-create an identical instance of primary VM 410. Those skilled in the art will recognize that the use of disk array storage systems, computer systems and the instantiation and number of backup VMs as depicted in FIG. 4 are only one of many different configurations that can be utilized within the scope of the invention. For example, all the computer systems (e.g., 400 and 405 in the embodiment of FIG. 4) in an embodiment may utilize the same disk array storage system rather than separate storage systems. Similarly, in an alternative embodiment, one computer system may be used only to store and retrieve log files and snapshots of various primary VMs and other separate computer systems may be used to instantiate backup VM instances using such log files and snapshots. Similar embodiment choices may be made at the VM level as well, for example, with one VM instance dedicated to managing the storage and retrieval of log files and snapshots while separate backup VMs are instantiated to consume such stored logs and snapshots upon the failure of a primary VM in order to serve as the failover VM.

Figure 5:
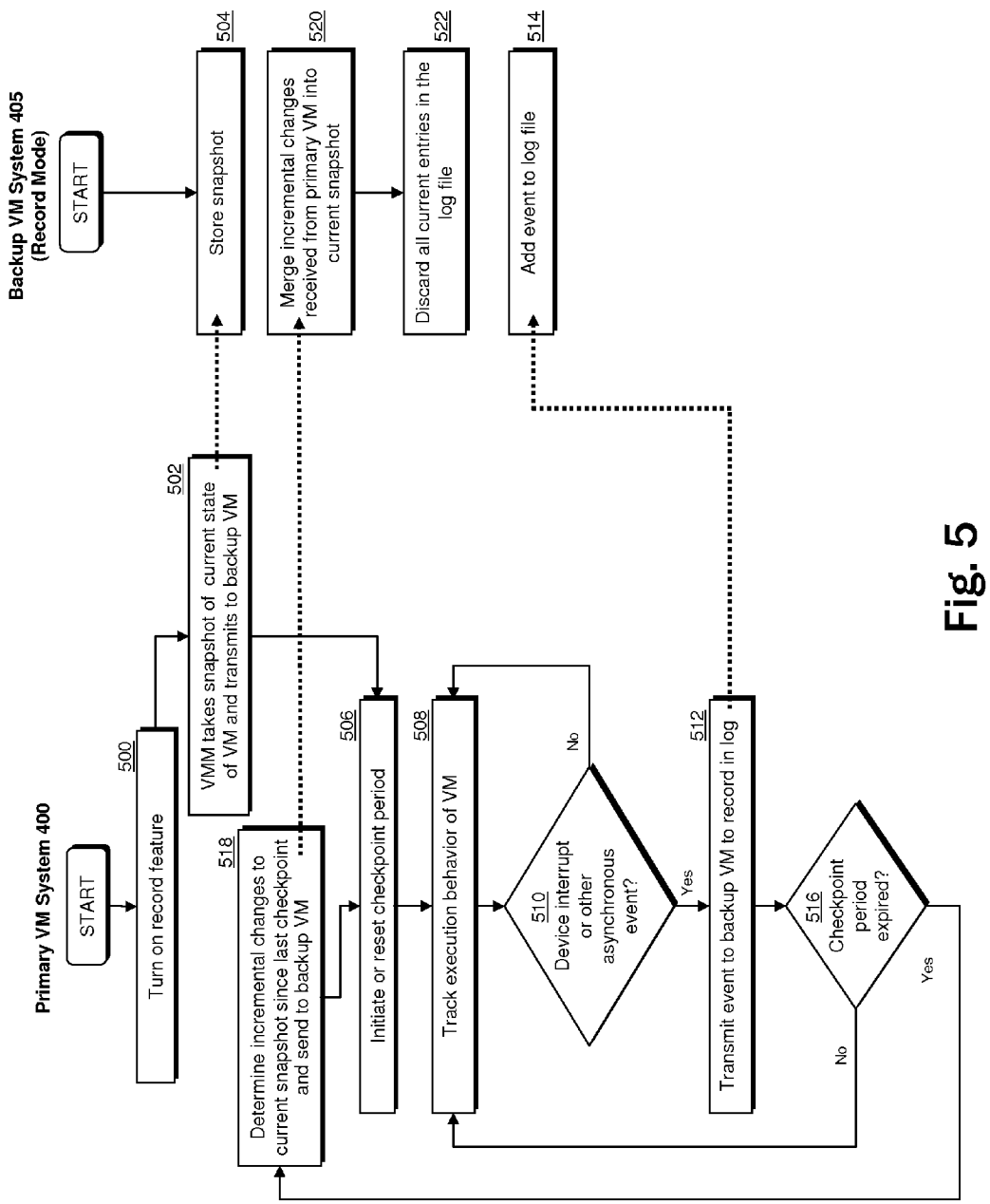
FIG. 5 depicts a flow diagram of one embodiment of the interactions between a primary virtual machine system and backup virtual machine system using checkpointing and replay to achieve fault tolerance.

As a way to decrease the time to recover from a failure and the amount of data that is stored in a log file, a "checkpointing" technique, as shown in FIG. 5, is used. Once the record feature is enabled on the primary VM system 400 (step 500), the primary VM's VMM takes a snapshot of the full VM state (e.g., guest memory, registers, disks, etc.) (step 502) and transmits the snapshot to the backup VM for storage (step 504). The primary VM will then initiate a checkpoint time interval (step 506) during which the primary VM will track system behavior including CPU and device activity as the VM executes (step 508). Similar to the record and replay techniques in Section C, the VMM may intercept non-deterministic events such as device interrupts or other asynchronous events occur (step 510) and transmit these events (and accompanying data) to the backup VM (step 512) for logging (step 514).

When the checkpoint time interval expires (step 516), the primary VM will "checkpoint" its state by determining the incremental changes made to the current snapshot (e.g., changed memory pages, disk sectors, registers, etc.) since the last checkpoint and propagate those changes to the backup VM (step 518). Those with ordinary skill in the art will recognize that the primary VM can determine incremental changes to the current snapshot through copy-on-write techniques and other similar page marking techniques. When the backup VM receives the new checkpoint changes, it merges the changes into its current snapshot image (thereby creating a new complete and up-to-date snapshot image) and may discard the replaced pages in the snapshot image (step 520). Those with ordinary skill in the art will recognize that depending upon the available computing resources of a system, these checkpoint merges may be expensive and can therefore be deferred in much the same way as replay is deferred. For example, in an embodiment similar to that of FIG. 5, such checkpoint merging is done on the fly, at the time that the backup VM system 405 receives the checkpoint changes in step 520. In an alternative embodiment, the checkpoint changes are saved or stored by the backup VM system 405 when received in step 520 and an up-to-date snapshot image is created through merging of the various checkpoint changes only upon a failure of the primary VM. Returning to the embodiment of FIG. 5, after receiving the checkpoint changes, the backup VM also discards all the entries in the log file (i.e., entries which are prior to a snapshot taken at the latest checkpoint) (step 522).

It should be recognized that there exist a variety of techniques to detect the failure of a system running the primary VM. In one example, a monitoring agent is responsible for receiving and/or checking a "heartbeat" of a primary VM system (e.g., a signal emitted by the system at regular intervals to indicate that it is alive). The monitoring agent may be implemented on a separate system coupled to the various other systems running primary and backup VMs or may be alternatively implemented within the backup VM systems. In either case, once the monitoring agent detects a failure of the primary VM, it notifies the backup VM system to begin restoration.

With the primary VM and backup VM interacting in a manner similar to that depicted in FIG. 5, upon a failure of the primary VM, the backup VM may reconstruct the current state of the primary VM in similar steps as those depicted in steps 312 to 322 of FIG. 3. However, since the snapshot image now reflects the state of the primary VM as of the most recent checkpoint and the log file contains only those non-deterministic events (and accompanying data) occurring since the last checkpoint, replay by the backup VM of the primary VM's execution since the last checkpoint is effectively bounded by the checkpoint time interval. In one embodiment, restoring the snapshot image at the time of failure is performed "lazily" in order to reduce the time needed bring up the backup VM. For example, memory pages in a snapshot image are not restored by a backup VM upon failure of a primary VM until the instruction stream requires access to such memory pages. Those with ordinary skill in the art will recognize that variations on the flow of FIG. 5 may be made without departing from the spirit of the teachings herein. For example, one embodiment takes a complete snapshot at the checkpoints (i.e., at the cost of execution overhead at the primary VM needed to create a complete snapshot) rather than determining incremental changes between checkpoints as in step 518. Similarly, backup VMs of an alternative embodiment store multiple snapshot images (i.e., at the cost of utilizing extra space to store such multiple snapshots images) rather than merge changes between checkpoint snapshots as in step 520. Alternatively, as previously discussed, backup VMs in alternative embodiments merge a previous snapshot (e.g., original snapshot in one embodiment) with later checkpoint changes upon failure of the primary VM or in an otherwise deferred fashion rather than merge changes on the fly, similar to FIG. 5. Similarly, in an alternative embodiment, the entries in the log file are not discarded as in step 522.

Those with ordinary skill in the art will recognize the inherent tradeoff between recovery time and overhead requirements when implementing a fault tolerant system. As discussed herein, this tradeoff can be managed by changing the period of time between checkpoints. The maximum time to recover from a failure is the amount of time to restore the checkpoint plus the time needed to replay an entire interval. While shrinking the interval between checkpoints reduces the maximum recovery time, it also increases the overhead of collecting and sending those checkpoints during failure-free operation. Even with incremental checkpoints, more frequent checkpoints may force the primary VM system in certain embodiments to mark the address space read-only more frequently (e.g., to implement copy on write for incremental checkpoint changes) and may force the primary VM system to transmit frequently changing pages more frequently.

E. Additional Embodiments

Those with ordinary skill in the art will recognize that the embodiments described herein are merely exemplary and that various alternative embodiments may be implemented consistent with the teaching disclosed herein. For example, those of ordinary skill in the art will recognize that the control logic and data stored and used by the various VMs as described in the foregoing specification (and figures) are merely illustrative and may be redistributed among the various VMs in alternative designs without departing from the scope or spirit of the described embodiments (but perhaps with different tradeoffs in the level of fault tolerance protection and use of computing resources). For example, while the embodiment of FIG. 4 depicts the log file 415 and snapshot image 420 as being stored persistently in a storage system; alternative embodiments may store the log and snapshot in memory or in a shared cache instead. Similarly, those with ordinary skill in the art will also recognize that the primary and backup virtual machine topologies in the various figures are merely exemplary and that other topologies can be used consistent with the spirit and scope of the invention. For example, an alternative embodiment to that of FIG. 4 may have both the primary VM system 400 and the backup VM system 405 utilizing the same storage system rather than separate storage systems. Similarly, multiple primary VMs and backup VMs on multiple computer systems may be utilized in a variety of topologies to offer differing levels of fault tolerance. For example, one VM may be dedicated to storing and retrieving log files, saving snapshots, and merging incremental checkpoint changes rather then serving as a failover backup instance. Similarly, a computer system running a primary VM may also be used to instantiate a backup VM for a second primary VM running on a different computer system. A computer system running a primary VM may also instantiate its own backup VM, for example, if immediate recovery is not required and any faulty hardware on the system can be repaired.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. For example, while the foregoing discussions have generally discussed recording and replay VMs having the same emulated devices, those with ordinary skill in the art will recognize that many of the teachings herein can also be performed at the hardware level, so long as the recording and replay VMs have the same physical hardware devices as well. Similarly, the foregoing discussions have discussed timing of the instruction stream in a general sense. Those with ordinary skill in the art will recognize that such timing may be measured at the instruction level (i.e., the $n^{th}$ instruction in the instruction stream) but that other measurements of time may be implemented in certain embodiments, for example, clock cycles, assuming certain guarantees of timing in the hardware platform.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components.

We claim:

1. A method for providing fault-tolerant protection for a primary virtual machine using a snapshot image of the primary virtual machine that represents a state of the primary virtual machine at a time $t_0$, the method comprising:
   forming a snapshot image of a state of the primary virtual machine;
   tracking virtual machine instructions executed by the primary virtual machine;
   executing an incremental checkpoint of a set of changes made to the state of the primary virtual machine since forming the snapshot image;
   merging the set of changes into the snapshot image, thereby creating a new snapshot image for a backup virtual machine without replaying the virtual machine instructions executed by the primary virtual machine;
   executing a subsequent incremental checkpoint of a set of changes made to the state of the primary virtual machine since forming the new snapshot image: and
   merging the set of changes of the subsequent incremental checkpoint into the snapshot image, thereby creating an updated snapshot image for a backup virtual machine without replaying the virtual machine instructions executed by the primary virtual machine, wherein each of the primary virtual machine and the backup virtual machine has a virtual hardware platform, and wherein the virtual hardware platform comprises a virtual processor, a virtual memory, a virtual network card and a virtual disk.

2. The method of claim 1 further comprising repeatedly executing subsequent incremental checkpoints and merging the set of changes of each subsequent incremental checkpoint into the updated snapshot image without replaying the virtual machine instructions executed by the primary virtual machine.

3. The method of claim 2 further comprising utilizing the updated snapshot image to implement the fault-tolerant protection in response to a failure of the primary virtual machine.

4. The method of claim 3 wherein replaying the execution of the instructions by the primary virtual machine upon implementing the fault-tolerant protection is limited to instructions executed since a last updated snapshot image was created.

5. The method of claim 1 further comprising the additional step of discarding the tracked set of changes after each merging.

6. A non-transitory computer readable storage medium having stored therein a computer program for providing a fault-tolerant virtual machine operating environment, wherein the computer program is configured to be executed on a computer system to carry out a method comprising:

forming a snapshot image of a state of a primary virtual machine;

tracking virtual machine instructions executed by the primary virtual machine;

executing an incremental checkpoint of a set of changes made to the state of the primary virtual machine since forming the snapshot image;

merging the set of changes into the snapshot image, thereby creating a new snapshot image for a backup virtual machine without replaying the virtual machine instructions executed by the primary virtual machine;

executing a subsequent incremental checkpoint of a set of changes made to the state of the primary virtual machine since forming the new snapshot image: and merging the set of changes of the subsequent incremental checkpoint into the snapshot image, thereby creating an updated snapshot image for a backup virtual machine without replaying the virtual machine instructions executed by the primary virtual machine, wherein each of the primary virtual machine and the backup virtual machine has a virtual hardware platform, and wherein the virtual hardware platform comprises a virtual processor, a virtual memory, a virtual network card and a virtual disk.

7. The non-transitory computer readable storage medium of claim 6 wherein the computer program is further configured to repeatedly execute subsequent incremental checkpoints and to merge the set of changes of each subsequent incremental checkpoint into the updated snapshot image without replaying the virtual machine instructions executed by the primary virtual machine.

8. The non-transitory computer readable storage medium of claim 6 wherein the computer program is further configured to utilize the updated snapshot image to implement the fault-tolerant protection in response to a failure of the primary virtual machine.

9. The non-transitory computer readable storage medium of claim 6 wherein the computer program is further configured to replay the execution of the instructions by the primary virtual machine upon implementing the fault-tolerant protection such that the replaying is limited to instructions executed since a last updated snapshot image was created.

10. The non-transitory computer readable storage medium of claim 6 wherein the computer program is further configured to execute the additional step of discarding the tracked set of changes after each merging.

11. The non-transitory computer readable storage medium of claim 6 wherein the computer program is further configured to delay the replay of the virtual machine instructions executed by the primary virtual machine on the backup virtual machine until a failure of the primary virtual machine.

12. The non-transitory computer readable storage medium of claim 11 wherein the delayed replay of the virtual machines includes the virtual machine instructions executed by the primary virtual machine since a last updated snapshot image was created.

13. The method of claim 1 further comprising delaying the replay of the virtual machine instructions executed by the primary virtual machine on the backup virtual machine until a failure of the primary virtual machine.

14. The non-transitory computer readable storage medium of claim 13 wherein the delayed replay of the virtual machines includes the virtual machine instructions executed by the primary virtual machine since a last updated snapshot image was created.

* * * * *